Figure 4:
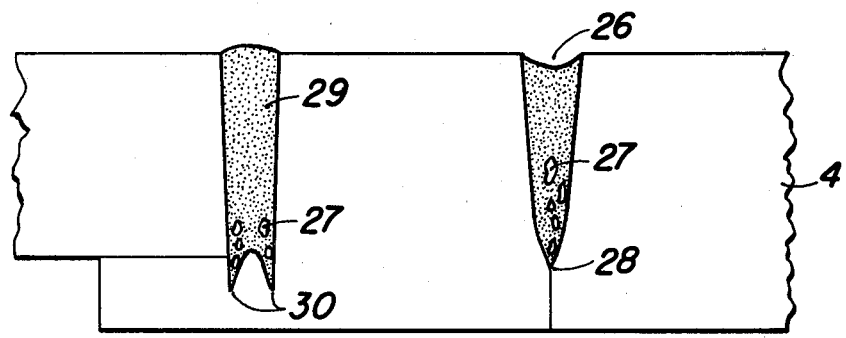

219-121
3/15/83 OR 4,376,886 SR

United States Patent [19]
Sciaky et al.

[11] 4,376,886
[45] Mar. 15, 1983

[54] METHOD FOR ELECTRON BEAM WELDING

[75] Inventors: Albert M. Sciaky, Palos Park; William J. Farrell, Flossmoor; Julius L. Solomon, Chicago, all of Ill.

[73] Assignee: Sciaky Bros., Inc., Chicago, Ill.

[21] Appl. No.: 222,722

[22] Filed: Jan. 2, 1981

[51] Int. Cl.$^3$ .............................................. B23K 15/00
[52] U.S. Cl. ...................... 219/121 ED; 219/121 EV; 219/121 EU; 219/125.12; 219/121 EW
[58] Field of Search ............ 219/125.12, 123, 121 EC, 219/121 ED, 121 EU, 121 EV, 121 ET; 228/8

[56] References Cited

U.S. PATENT DOCUMENTS 1,933,340 10/1933 Raymond ........................ 219/125.12
4,019,016 4/1977 Friedman et al. ............... 219/125.12

FOREIGN PATENT DOCUMENTS 2634342 2/1978 Fed. Rep. of Germany ...... 219/121 ED
55-84283 6/1980 Japan ............................ 219/121 EC

OTHER PUBLICATIONS

Metals Handbook, pp. 547-549, "Electron Beam Welding", 8 Edition, vol. 6, Copyright 1971.

*Primary Examiner*—M. H. Paschall
*Attorney, Agent, or Firm*—J. L. Solomon

[57] ABSTRACT

This invention concerns a process of welding by an electron beam. The process is one in which the beam is rapidly deflected from point to point of a predetermined matrix of spots over which the beam rests for predetermined lengths of time in order to produce a predetermined distribution of energy over a defined area along the surface of the material being welded along a seam formed at the adjacent edges of workpieces. The length of time the beam is maintained at each position and the total beam power may be varied from spot to spot in order to produce a desired distribution of energy over a given area. This process is useful to avoid defects in partial penetration welds and in the welding of joints in which the gap between the edges to be welded may approach the diameter of the electron beam. The method is also useful in avoiding defects which may normally occur at the beginning and end of a weld seam.

3 Claims, 9 Drawing Figures

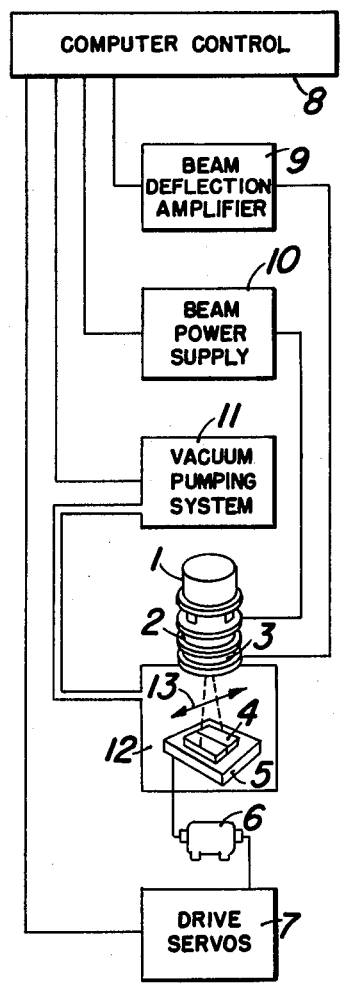
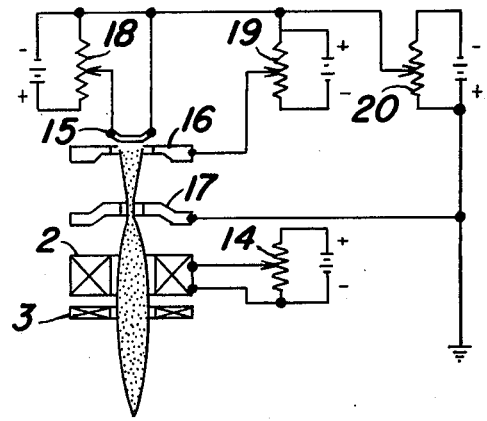
FIG. 2
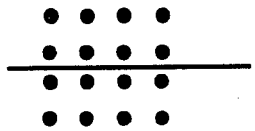
FIG. 7
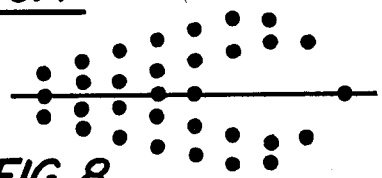
FIG. 8
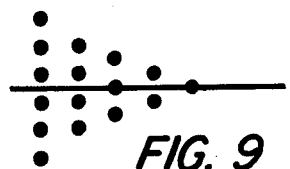
FIG. 9
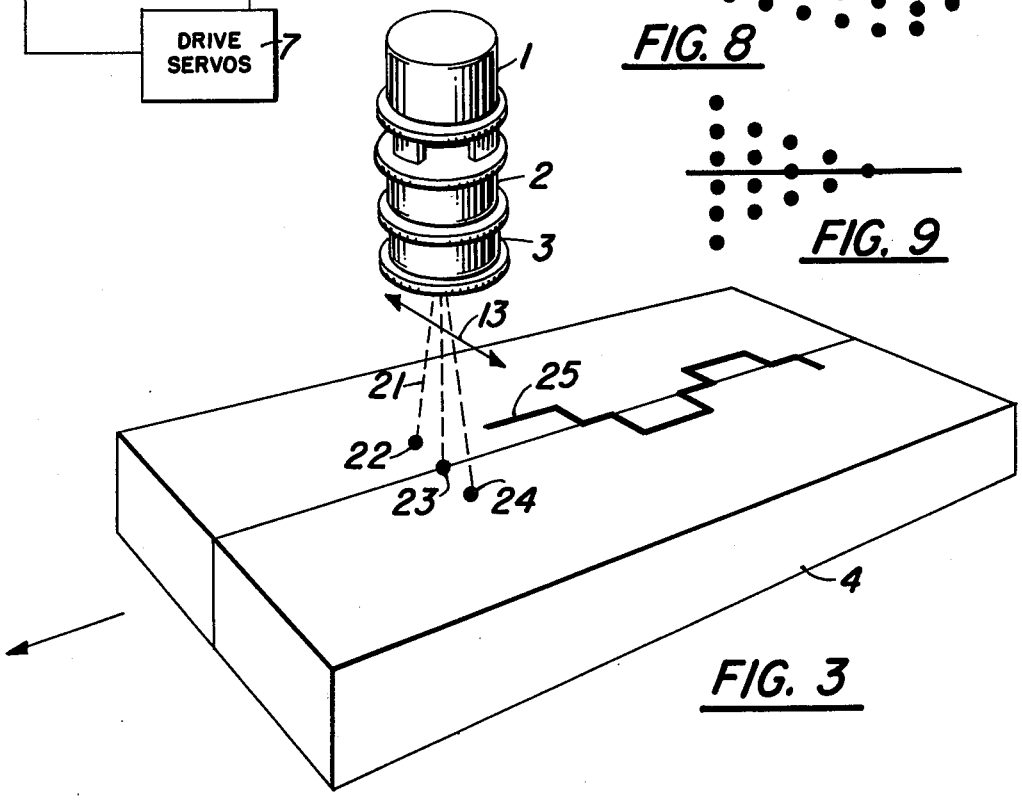
FIG. 1
FIG. 3

U.S. Patent    Mar. 15, 1983    Sheet 2 of 2    4,376,886

METHOD FOR ELECTRON BEAM WELDING

This invention concerns a process for the welding of thick metal plates by means of an electron beam. Specifically, a method is here described for avoiding root defects in partial penetration welds, as well as in the up-and-down slope portions of full penetration welds and the avoidance of weld defects in welding joints which are separated by a relatively wide gap.

In the fabrication of large structures from aluminum or steel where the thickness of the plates utilized in the fabrication may be one and one-half inches or more, the design of the structure often calls for partially penetrated welds between plates of relatively heavy thickness. It has also been found that it is not practical to fit up a gap between the edges to be welded which is rather substantial, sometimes approaching the diameter of the electron beam. Normally, the process of electron beam welding of metals consists of generating an electron beam of high power but of small dimension, somewhere on the order of 0.010–0.050 inches in diameter, directing the beam to the surface of the workpiece and causing relative motion between the work and the electron beam with the beam directed on the seam to be welded. This process has been found to be extremely useful and produces high-quality welds between the two parts without excessive distortion of the resulting assembly. When thicker plates, on the order of one and one-half inches in section or more, are welded, an examination of the weld section usually reveals a weld section which resembles a spike in which appear many porosities, especially towards the bottom, pointed end, of the weld zone. This defect is especially apparent in the making of partially penetrated welds in heavier plates. In addition to the above, if the parts are separated by a gap, the weld section will show a crater at the top of the weld whose depth depends on the gap width. Other defects may appear at the beginning of a weld seam during the upslope portion of the weld and at the end of a seam during the downslope portion of full penetration welds.

In the past, attempts have been made to overcome the above weld defects by oscillating the beam transversely to the seam or by causing the beam, at the point where it strikes the work, to describe a circular, elliptic or sinusoidal motion. These methods produced welds without a groove at the top of the weld, but at the bottom of the weld, two spikes were produced, one on each side of the seam. Additional defects are numerous porosities which weaken the material and create stress raisers in these areas. After extensive experimentation, a method was discovered by which welds can be made, in metal plates having thicknesses in excess of one and one-half inches, which are sound, free from porosities and free from a trough or depression at the top of the weld and which are formed with parallel sides the full length of the weld, free from spiking at the bottom of the weld. The resulting method of the present invention consists of generating an electron beam of high power, focusing the beam to a predetermined point in relation to the work and directing the beam towards the seam, causing the workpieces to move in relation to the beam along the direction of the seam which is to be welded and deflecting the beam in a matrix pattern consisting of a multiplicity of points to which the beam is rapidly deflected, the beam being allowed to dwell at each of the points for a predetermined period of time. This program of beam displacement and dwell times is repeated continuously in the desired pattern as the workpiece is moved relative to the beam along the seam which is being welded. The matrix pattern and dwell time at each point is selected depending upon the thickness of the materials to be welded, the type of material and the separation or gap between the adjacent edges of the workpieces to be welded. An example of a simple, four-point matrix would be one in which the beam is deflected from the seam at an extremely high velocity in a direction transverse to the seam for a distance in the order of the width of the beam, maintaining this position of the beam for a predetermined length of time, returning the beam to the seam in a like manner and maintaining it at the seam for a predetermined period of time, deflecting the beam to the other side of the seam and maintaining it in that position for a predetermined length of time, and then returning the beam to the seam and maintaining the beam at that position for a predetermined length of time and continuing this program of beam deflection and beam dwell until the full length of the desired seam is welded.

The object of this invention is to provide a method and apparatus by which void-free, partially penetrating welds may be realized in heavy plates.

Another object of the invention is to produce deep welds in which the lower portion of the weld is free from spikes, porosities or stress raisers.

Another object is to provide a means for satisfactorily welding heavy plates whose edges are separated by a gap whose width approaches the diameter of the electron beam.

Another object is to provide a method whereby one or more of the welding parameters are automatically adjusted, depending upon the gap between the plates being welded, so as to produce a satisfactory weld along the full length of a seam to be welded, although the gap between the seam may vary from place to place along the seam.

Another object of the invention is to provide a method by which root defects are avoided at the beginning and the end of a seam weld of the partial penetration or full penetration type.

These and other objects and advantages will become more apparent in view of the following detailed description taken in conjunction with the drawings described below:

FIG. 1—represents schematically an electron beam welding machine.

FIG. 2—is a schematic drawing of the essential elements of an electron gun and its power supply.

FIG. 3—is a perspective view of the work being welded and illustrates the path taken by the beam with respect to the work, utilizing a simple, four-point raster.

FIG. 4—is a cross section of welds resulting from the use of prior methods of welding heavy sections of material.

Figure 5:
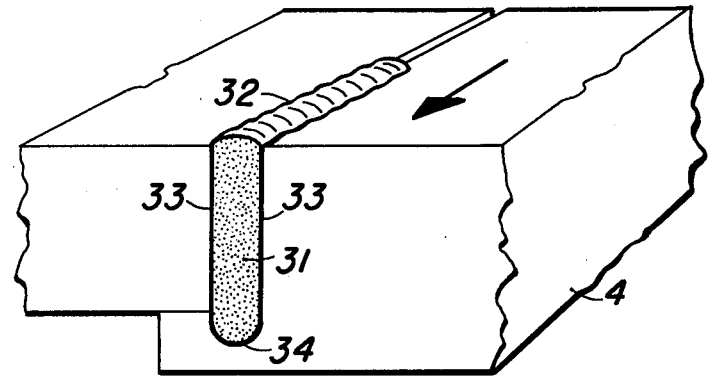
Figure 6:
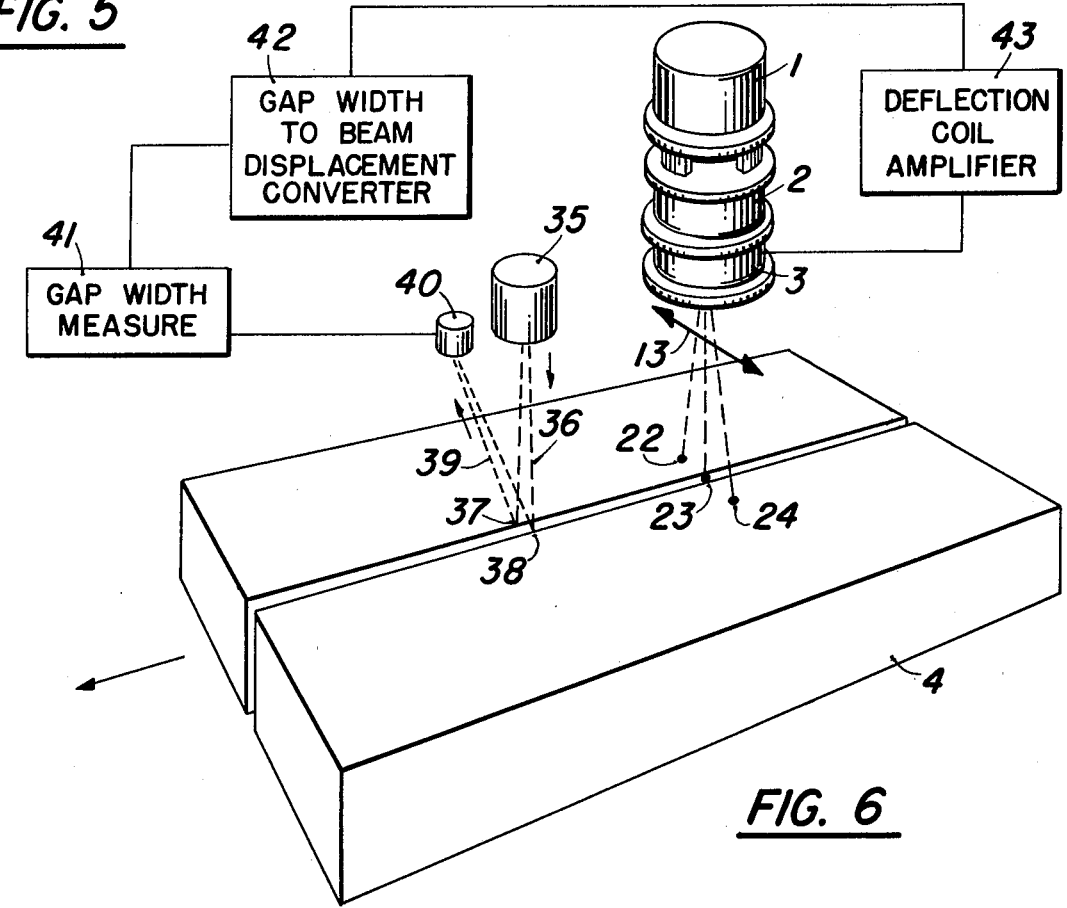

FIG. 5—is a cross section of welds made in accordance with the method of the present invention. FIG. 6—illustrates a variation of the method which includes measuring the gap width at a point a short distance ahead of the point where the beam strikes the workpiece and varying one or more of the welding parameters in accordance with a predetermined program.

FIGS. 7, 8, and 9—illustrate dot matrices, each of which provides a different energy distribution profile.

Referring now to FIG. 1, which illustrates the complete system for welding by an electron beam, we may note the electron beam gun "1", fitted with a focus coil "2" for focusing the electron beam on the workpieces and deflection coils "3" for deflecting the beam along two mutually perpendicular axes under the control of a predetermined program which has previously been placed in the memory of the computer control "8" by the system operator. The parts to be welded "4" are mounted upon a carriage "5" within a vacuum chamber "12" which is maintained at a low pressure suitable for the electron beam welding process by a vacuum pumping system "11". The motion of carriage "5" is effected along the axis of required motion by means of servomotor "6", which is controlled by servo-drive "7". The motor positions the carriage within the chamber so that the work will be properly positioned with respect to the resting position of the electron beam "13" which is deflected by the action of the magnetic fields of the deflection coils which are under control of beam deflection amplifiers "9" which in turn are controlled by information previously stored in the computer control memory. Computer "8" not only controls the beam deflection program, but also controls the electron beam gun parameters of accelerating potential, beam current, focus coil current, as well as the vacuum pumping system and the servo-drives which are used to drive the parts being welded. In order to perform a welding operation, a machine operator would mount the parts upon a supporting fixture inside the vacuum chamber, close the door of the vacuum chamber and initiate the functioning of the machine by pressing a "start" button. The machine control then takes over the operation, causing the vacuum pumps and vacuum valves to be operated so that the vacuum chamber "12" in which the parts have been placed is evacuated rapidly, after which the electron beam gun is energized and the parts positioned so that the electron beam will strike the work at the desired starting position for the welding operation after which the electron beam will be initiated while the work is moved and the beam is controlled in accordance with the previously established program placed in the computer memory. Several welding parameters are controlled through the program in the computer control through the electron beam deflection amplifier "9" and the beam power supply "10", and the motion of the parts is controlled by motor "6" under control of the drive-servo "7". As the work is moved in the direction of the seam to be welded, the electron beam is deflected in accordance with the teachings of this invention to produce a sound seam weld along the full length of the seam.

FIG. 2 illustrates in schematic form the general arrangement of the principal elements of an electron beam gun and its associated electrical supplies. The elements of an electron beam gun are comprised of a filament "15", a cathode "16", an anode "17", a focus coil "2", deflection coils "3", and their associated supplies "18", "19", "20" and "14". Filament current supply "18" delivers current to filament "15" and brings the temperature of the filament to the level at which it is in condition to deliver electrons. A high-voltage power supply "20" applies a potential of 60,000 volts to anode "17" with respect to the filament "15" to cause the electrons to be accelerated towards the anode and through an aperture in the anode so as to form a beam of electrons moving at a velocity which may approach the speed of light. The cathode "16" and anode "17" are shaped in such a manner as to create an electrostatic field between the anode and the cathode which causes the electron beam to be directed towards a point a short distance outside of the anode. An adjustable DC power supply "19" of approximately 2,000 volts is applied between the filament and the cathode and by this means, the intensity of the electron beam current may be controlled. Increasing the negative potential on the cathode with respect to the filament reduces the electron beam current and vice versa. Beyond the opening in the anode there exists an electrostatic field free space in which the beam passes through the focus coil "2", where it is magnetically focused to a desired spot on a workpiece by adjusting the current applied to the focus coil by power supply "14". Directly below the focus coil "2", the deflection coil "3" causes the beam to be deflected along two mutually perpendicular axes to cause the beam to impinge sequentially at desired points upon the work. The output of all the various current and voltage supplies for the electron beam gun may be controlled by the computer and all may be programmed so that these values may be modified and varied as the welding progresses, as will be explained later.

FIG. 3 illustrates in perspective the physical relationship between the parts to be welded "4" and the electron gun "1", showing the motion imparted to the electron beam in relation to the seam to be welded for a simple case. The dotted line "21" represents the electron beam emanating from the electron gun. In accordance with the invention, the electron beam is caused in this case to move transversely to the seam to be welded in accordance with a predetermined program in which the beam is first directed to the center of the seam at point "23", rests at that point for a predetermined length of time, is deflected then to point "22", returns to "23", is deflected to "24", and returns again to "23", remaining in each position for a predetermined time, and continues with this program as the work is moved in the direction of the arrow under the stationary gun. The beam will therefore be caused to strike the work along the path "25", shown in greatly elongated form. The amount of displacement of the beam in the transverse direction will depend upon the thickness of the material to be welded and the gap between the parts. For example, in the welding of 1½ inch thick plates of aluminum which had a gap between the edges of 0.040 inch, it was determined that sound welds could be obtained by displacing the beam to a point 0.060 of one inch away from either side of the seam center and allowing the beam to dwell at 334 microseconds at points "22" and "24" and 166 microseconds at point "23", and continuously displacing the beam from one side of the center to the other side with a transit time in the order of a few microseconds while the work is moving at a rate of 30 inches per minute in the direction of the seam. Prior attempts to weld heavy gauges of material were made by moving the seam to be welded under a stationary beam or by oscillating the beam, either with a square, circular or elliptical motion of the beam across the seam, but the results were far from satisfactory.

FIG. 4 illustrates the cross sections of seams that have been welded in this manner. At the right is a cross section of a partial penetrating weld produced by a stationary beam focused on the center of the adjacent edges of the two workpieces. The resulting weld contains numerous porosities "27", is sharp at the lowest level "28" and has a depressed section "26" at the top of the weld. The welded cross section illustrated at the left is a weld produced through the use of circular oscillation of the beam. The weld is straight-sided, and is not depressed at the top, but is unsatisfactory inasmuch as the lower part has two spikes "30" at either side of the weld which are filled with porosities "27". Both of these welds would also be unsatisfactory because the sharp points act as stress raisers and the joint would not be able to develop the full strength of the parent material.

FIG. 5 illustrates in cross section a weld made by the method of the present invention. The weld is straight-sided "33", sound over its full depth "31" and is free from spiking, being characterized, rather, by a rounded portion "34" at the bottom. There is no depression at the top of the weld "32".

FIG. 6 illustrates the refinement to the method which may be utilized in those cases where the gap is not uniform through its length, but varies from point to point because of variations in machining or in placement of the two parts to be welded. In such cases, a device for measuring the width of the gap is oriented a short distance ahead of the spot where the electron beam strikes the work. The gap width measuring system is comprised of an electron or radiant beam generator "35" which directs a beam of electrons or radiant energy "36" toward the gap. The beam is caused to move periodically at a given frequency so that it crosses the adjacent edges of the work at "37" and "38". Reflected electrons or radiant energy "39" is reflected from the work surfaces and picked up by receiver "40". At the instant the oscillating beam crosses the adjacent edges of the workpieces, there will be an abrupt change in the intensity of the reflected energy reaching the receiver from a maximum when the beam "36" is striking the work to a minimum when the beam penetrates the gap between the adjacent edges of the workpieces. The period during which the energy is at a level below the energy level received while the beam is striking the work surface is then translated to an analog voltage defining the gap width from point to point along the seam by gap width measuring means "41". This gap width analog voltage is then delivered to a gap width to beam displacement converter "42", which acts upon the deflection coil amplifier "43" and causes the beam to be deflected by an amount sufficient to produce the desired quality of weld. The signal obtained from the gap width to beam displacement converter "42" may, as an alternative, be caused to act upon any of the welding parameters desired in a predetermined manner as may be determined by experimentation in order to produce satisfactory welds.

FIG. 7 is an illustration of a dot matrix of rectangular shape which will produce a distribution profile of energy at the weld area which may be useful in the welding of plates separated by a gap. FIGS. 8 and 9 illustrate other matrix point distributions which may be used to avoid root defects at the beginning and at the end of a weld seam. The means described herein for practicing the method may be utilized to provide a wide variety of energy distribution profiles, as is required for an unlimited range of welding applications.

What is claimed is:

1. A method of seam welding two workpieces by the electron beam welding process so as to form a seam along the full length of their adjacent edges, including the steps of:
   causing the beam to dwell for a predetermined period at a first position on the adjacent edges of said workpieces while said workpieces are at rest;
   deflecting the beam transversely from said adjacent edges for a predetermined distance to one side of said seam and maintaining the beam in this position for a predetermined time;
   returning the beam to the seam and maintaining it in position for a second predetermined time;
   deflecting the beam to the opposite side of the seam from its first motion and maintaining it in this position for a predetermined time;
   returning the beam to the center of the seam and maintaining it at this point for a predetermined time; and
   repeating the above program of beam displacement and dwell time continuously as the work is moved under the beam.

2. A method of seam welding two workpieces by the electron beam welding process whose edges are separated by a gap in which the said gap width is measured dynamically by moving, at a given speed, an electron beam transversely across the gap between the two plates being welded, measuring the period between abrupt variations in intensity of electrons reflected from the said plates and translating said period to an analog voltage which defines gap width, generating a deflection coil current in accordance with a previously established law of gap width versus gap width voltage analog, passing said deflection coil current through a deflection coil associated with said electron gun so as to cause a variation in displacement of the beam on the workpieces with respect to the measured gap width.

3. A method in accordance with claim 2 in which the said analog voltage which defines gap width acts upon one of the welding parameters to cause the said parameter to vary in accordance with a preset program of gap width versus the parameter being varied.

* * * * *